(12) United States Patent
Tu

(10) Patent No.: US 7,375,862 B2
(45) Date of Patent: May 20, 2008

(54) METHOD FOR MULTI-FUNCTION SCANNER

(75) Inventor: Ching-Jung Tu, Hsinchu (TW)

(73) Assignee: Avision Inc. (TW)

( * ) Notice: Subject to any disclaimer, the term of this patent is extended or adjusted under 35 U.S.C. 154(b) by 1056 days.

(21) Appl. No.: 10/633,651

(22) Filed: Aug. 5, 2003

(65) Prior Publication Data
US 2004/0207889 A1    Oct. 21, 2004

(30) Foreign Application Priority Data
Apr. 18, 2003    (TW) .............................. 92109328 A

(51) Int. Cl.
*H04N 1/04* (2006.01)
*H04N 1/387* (2006.01)
*H04N 1/38* (2006.01)

(52) U.S. Cl. .................. 358/474; 358/475; 358/450; 358/463

(58) Field of Classification Search ........... 358/474, 358/475, 450, 463, 509, 553; 382/282, 135
See application file for complete search history.

(56) References Cited

U.S. PATENT DOCUMENTS

| 6,075,590 A | 6/2000 | Edgar | |
| 6,494,490 B1 * | 12/2002 | Trantoul | 283/91 |
| 6,753,984 B1 * | 6/2004 | Wada | 358/475 |
| 6,793,417 B2 * | 9/2004 | Edgar et al. | 396/568 |
| 6,919,974 B1 * | 7/2005 | Ichikawa et al. | 358/475 |
| 2001/0031144 A1 * | 10/2001 | Edgar et al. | 396/564 |
| 2002/0159165 A1 * | 10/2002 | Ford | 359/722 |

FOREIGN PATENT DOCUMENTS

TW          509801          6/1991

* cited by examiner

*Primary Examiner*—Houshang Safaipour

(57) ABSTRACT

A method for a multi-function scanner for scanning a document with a laser/anti-counterfeit mark includes the steps of: pre-scanning the document to obtain a preview image; recording a zone of the laser/anti-counterfeit mark selected by a user on the preview image as a marked zone; using a visible light source to scan the document so as to obtain a first image corresponding to the document excluding the marked zone; using an infrared right source to scan the document so as to obtain a second image corresponding to the marked zone; and combining the first image with the second image.

3 Claims, 3 Drawing Sheets

METHOD FOR MULTI-FUNCTION SCANNER

This nonprovisional application claims priority under 35 U.S.C. § 119(a) on Patent Application No(s). 092109328 filed in TAIWAN on Apr. 18, 2003, which is(are) herein incorporated by reference.

BACKGROUND OF THE INVENTION

1. Field of the Invention

The invention relates to a method for a multi-function scanner, and more particularly to a method applied to a multi-function scanner capable of scanning a normal document without a laser/anti-counterfeit mark and a special document with the laser/anti-counterfeit mark and capable of effectively removing the laser/and-counterfeit mark from the scanned image.

2. Description of the Related Art

FIG. 1 is a schematic illustration showing a conventional flatbed scanner. As shown in FIG. 1, a scanner 100 is used to scan a to-be-scanned document 200 placed thereon. The scanner 100 includes a guiding rod 120 and a scan module 110 that may be moved along the guiding rod 120. The scan module 110 includes a light source 111, reflecting mirrors 112, a lens module 113, and an image sensor 114.

The light source 111 emits white light rays (visible light rays) to illuminate the document 200, and the light rays are partially reflected to the reflecting mirrors 112, which reflect the light rays to the lens module 113, which focuses the light rays on the image sensor 114. The image sensor 114 converts optical signals into electrical signals, which are processed and then transferred to a computer or other processing devices for further processing. For example, the image signals of the scanned document may be transferred to the computer, which may recognize the image signals into character data.

Since the conventional to-be-scanned documents belong to black/white or color documents, the conventional scanner may scan these documents and obtain good effects. However, laser/anti-counterfeit marks have been added to some important documents, such as ID cards, passports, savings-account books, or other confidential documents in order to prevent the documents from being counterfeited, and the conventional scanner cannot scan these documents with clear effects. This is because the laser/anti-counterfeit marks may shield the information on the documents.

Thus, it is necessary to discriminate if the documents with the laser/anti-counterfeit marks are true or not by the human or machines in the airport, customhouse, or bank, and then to scan the documents with the laser/anti-counterfeit marks using scanners. The scanned image information is then recognized into character information such as numbers and names by processors or computers.

Since the laser/anti-counterfeit marks are typically superimposed on the character information, the scanned image information is typically interfered by the laser/anti-counterfeit marks and becomes blurred when the conventional scanners are used. Therefore, the recognition precision will be influenced and better recognition effects cannot be obtained even if the scan mode is switched to black/white, gray-scale, or color mode.

Thus, it is a great advantage to the user if a scanner can clearly scan a normal document and a special document with a laser/anti-counterfeit mark.

Edgar discloses a method for removing the effect of surface defects from a scan of an image behind a surface using an infrared light source and a visible light source in U.S. Pat. No. 6,075,590. In this disclosure, two scanning processes are performed using the visible light source and the infrared light source to illuminate the document, and the surface defects of the document are removed according to two scanning results. However, no technology with regard to the laser/anti-counterfeit marks has been disclosed.

Taiwan Patent Publication No. 509801 discloses an apparatus for compensating for the optical properties of an object according to light sources with different wavelengths. In this disclosure, the document is scanned twice using a visible light source and an infrared light source to illuminate the document, and then the image are compensated and repaired according to two scanning results. However, no technology with regard to the laser/anti-counterfeit marks has been disclosed.

Thus, it is an important subject of the invention to provide a method applied to a scanner capable of scanning a normal document without a laser/anti-counterfeit mark, and a special document having the laser/anti-counterfeit mark without being influenced by the mark.

SUMMARY OF THE INVENTION

It is therefore an object of the invention to provide a method applied to a multi-function scanner, which may scan a first document without a laser/anti-counterfeit mark and a second document with a laser/anti-counterfeit mark and may effectively remove the laser/anti-counterfeit mark from a scanned result of the second document.

Another object of the invention is to provide a method applied to a multi-function scanner, which is capable of conveniently enabling the scanning process of the first document or the second document.

To achieve the above-identified objects, the invention also provides a method for a multi-function scanner for scanning a document with a laser/anti-counterfeit mark. The method includes the steps of: pre-scanning the document to obtain a preview image; recording a zone of the laser/anti-counterfeit mark selected by a user on the preview image as a marked zone; using a visible light source to scan the document so as to obtain a first image corresponding to the document excluding the marked zone; using an infrared light source to scan the document so as to obtain a second image corresponding to the marked zone; and combining the first image with the second image.

According to the method, it is possible to obtain scanned images with the complete first image and second image.

DETAILED DESCRIPTION OF THE INVENTION

In order to effectively remove a shielding effect of a laser/anti-counterfeit mark on a document when the document having the laser/anti-counterfeit mark is scanned, the present inventor tries to find a light source, which is capable of emitting light rays to penetrate through the laser/anti-counterfeit mark, as another light source for the scanner according to the property of the laser/anti-counterfeit mark. After the actual test, the present inventor finds that infrared light rays may directly penetrate through the laser/anti-counterfeit mark. That is, the laser/anti-counterfeit mark is regarded as transparent in the optical system of the infrared light rays. On the other hand, an image sensor of the scanner may sense infrared light rays. Thus, if the infrared light source is used as another light source in conjunction with a visible light source that is already existed in the scanner, the shielding effect caused by the laser/anti-counterfeit mark may be effectively removed.

Figure 1:
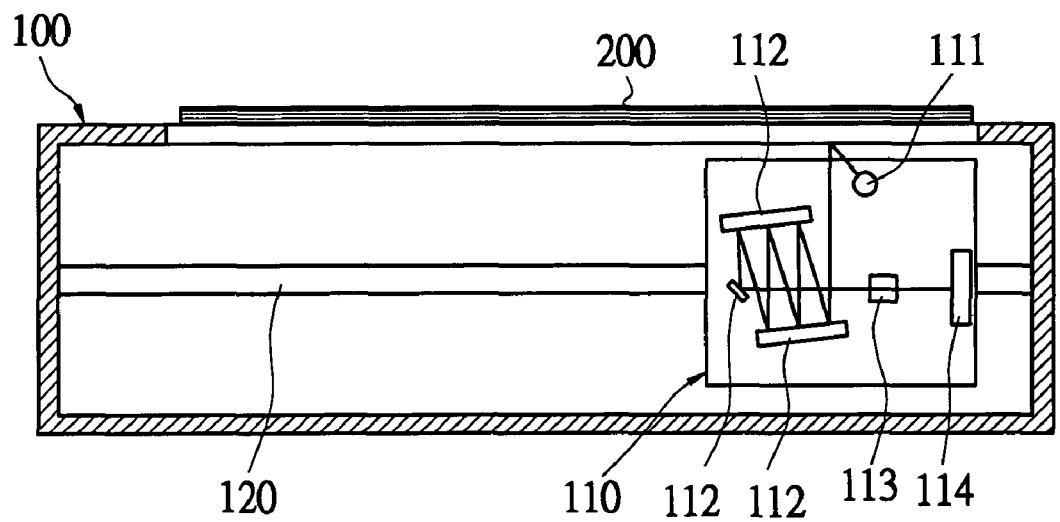
FIG. 1 is a schematic illustration showing a conventional flatbed scanner.
Figure 2:
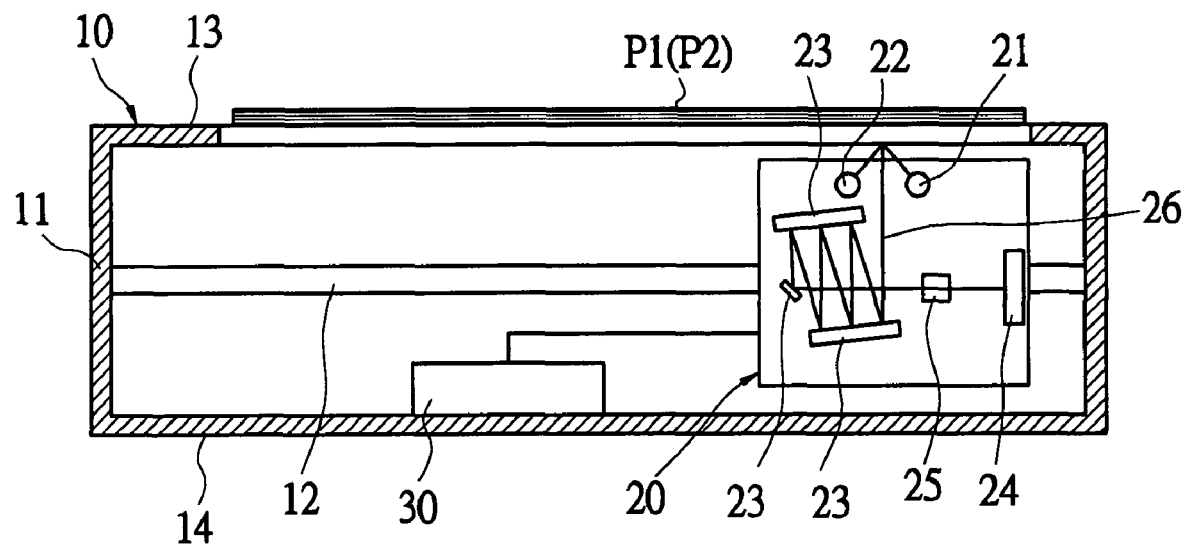
FIG. 2 is a schematic illustration showing a multi-function scanner according to a first embodiment of the invention.

FIG. 2 is a schematic illustration showing a multi-function scanner according to a first embodiment of the invention. As shown in FIG. 2, the multi-function scanner 10 may selectively scan a first document P1 without a laser/anti-counterfeit mark and a second document P2 with the laser/anti-counterfeit mark. When the first document P1 is scanned, the multi-function scanner 10 enables a first mode scan. When the second document P2 is scanned, the multi-function scanner 10 enables a second mode scan. In the second mode scan, the laser/anti-counterfeit mark on the second document P2 may be effectively removed from a scanned result, so the scanned result of the second document P2 is free from be influenced by the shield effect of the laser/anti-counterfeit mark. Consequently, when the document or exhibit with the laser/anti-counterfeit mark is scanned, it is possible to obtain a clear scanned result and transfer it to a computer system to perform the process of information recognition.

The multi-function scanner 10 includes a housing 11, a guiding rod 12, a top 13, a bottom 14, a scan module 20, a scan mode control unit 30. The guiding rod 12 is mounted to the housing 11, and the scan module 20 may be moved along the guiding rod 12. The scan module 20 includes a first light source 21, a second light source 22, reflecting mirrors 23, an image sensor 24, and a lens module 25. The first light source 21 is enabled to emit visible light rays to illuminate the first document P1, and the second light source 22 is enabled to emit infrared light rays to illuminate the second document P2. The lens module 25 focuses reflected light rays 26 from the first or second document P1 or P2 onto the image sensor 24. The scan mode control unit 30 controls the scan module 20 to selectively enable the first light source 21 and the second light source 22 to perform the first mode scan or second mode scan. The scanned result of the first or second mode scan is transferred to a computer for processing, such as character recognition.

Although the flatbed scanner is illustrated as an example of the embodiment, it is not intended to limit the invention thereto. Instead, the invention also may be applied to the sheet-fed scanner. Furthermore, although the scanner of the embodiment includes a guiding rod 12, other transmission mechanisms without the guiding rod 12 may also be used. For example, the sheet-fed scanner does not need any guiding rod 12.

If the user needs to scan the first document P1 and the second document P2, the process for scanning the first document P1 or the second document P2 may be controlled by switching the scan mode. In one embodiment, the scan mode may be switched using software interfaces of the computer. In this case, the software interfaces may include a scan mode selecting unit for the user to select a first mode or a second mode. Alternatively, a button or buttons of the scanner may be used to switch the scan mode of the scanner. In this case, the scanner may include a scan mode selecting unit for the user to select the first mode or the second mode. The details will be described in the following.

Figure 3:
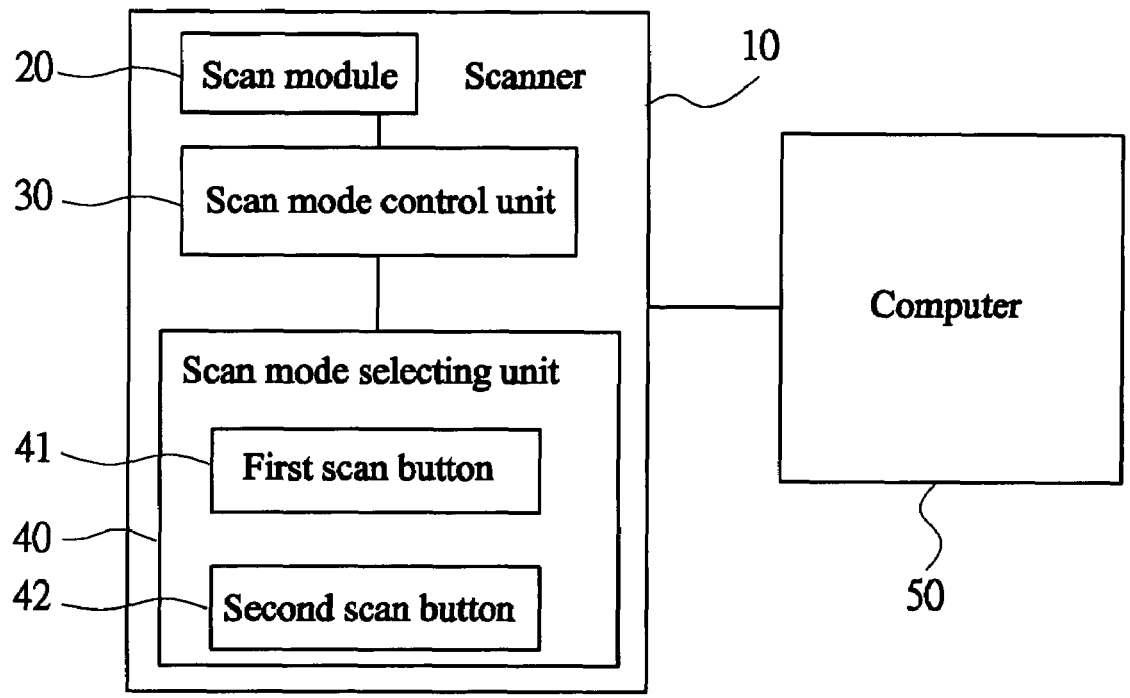
FIG. 3 is a block diagram showing a computer and a multi-function scanner according to a second embodiment of the invention.

FIG. 3 is a block diagram showing a computer and a multi-function scanner according to a second embodiment of the invention. Referring to FIG. 3, the multi-function scanner 10 includes the scan module 20, the scan mode control unit 30, and a scan mode selecting unit 40 for the user to select one of the first mode or the second mode. The selected result is then transferred to the scan mode control unit 30, which may control the scan module 20 to perform the scanning process of the first mode or the second mode.

The scan mode selecting unit 40 includes a first scan button 41 and a second scan button 42. The user may press the first scan button 41 to control the scan module 20 to perform the first mode scan. The user may press the second scan button 42 to control the scan module 20 to perform the second mode scan. The scanned result is finally transferred to a computer 50, which may recognize or process the scanned result. Consequently, a clear scanned result may be obtained and then recognized no matter which of the first document P1 and the second document P2 is scanned.

Because the scanner of this embodiment performs the first mode scan or second mode scan according to the user's selection, the user has to press the first scan button 41 or the second scan button 42 to perform the scanning process. However, it is inconvenient to the user who wants to scan a lot of first documents P1 or second documents P2. Therefore, the invention also provides a convenient way as described hereinbelow.

Figure 4:
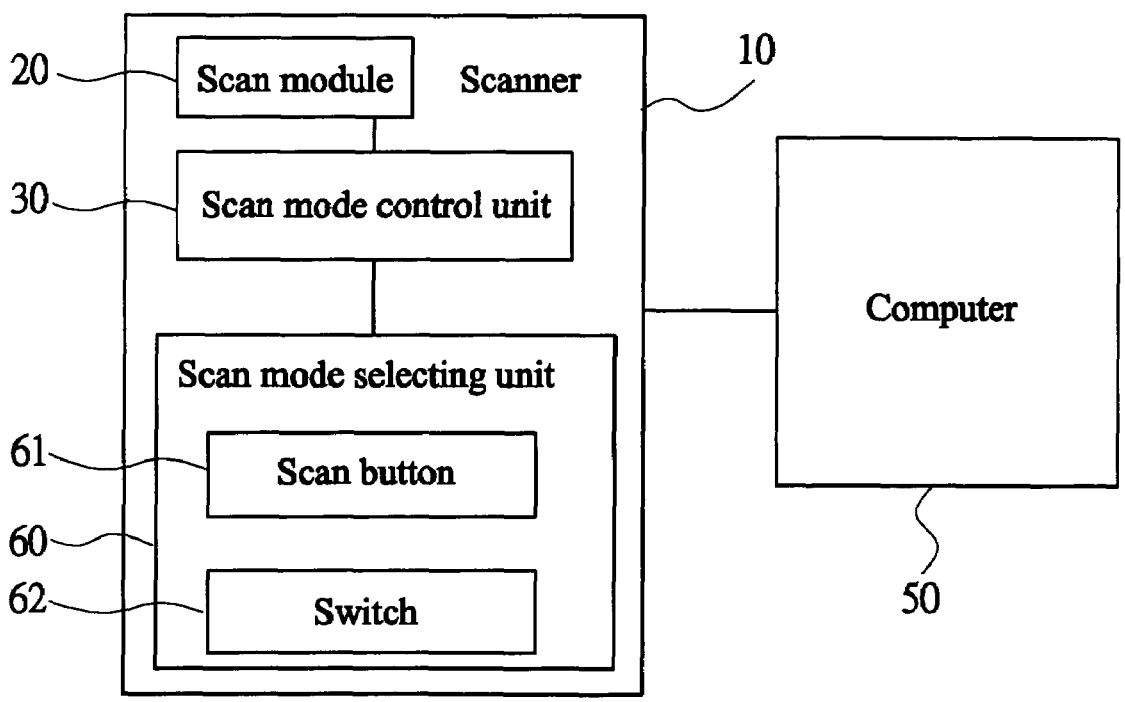
FIG. 4 is a block diagram showing a computer and a multi-function scanner according to a third embodiment of the invention.

FIG. 4 is a block diagram showing a computer and a multi-function scanner according to a third embodiment of the invention. Referring to FIG. 4, a scan mode selecting unit 60 includes a scan button 61 and a switch 62. The user may press the scan button 61 to control the scan module 20 to scan, and the user may switch the switch 62 into the first mode or the second mode, wherein the first mode or the second mode is not changed until the user switches the switch 62. That is, when the user wants to scan a lot of first documents P1, he or she only has to switch the switch 62 into the first mode, and then only has to press the scan button 61 to scan the documents. On the other hand, when the user wants to scan a lot of second documents P2, he or she only has to switch the switch 62 into the second mode, and then only has to press the scan button 61 to scan the documents.

Figure 5:
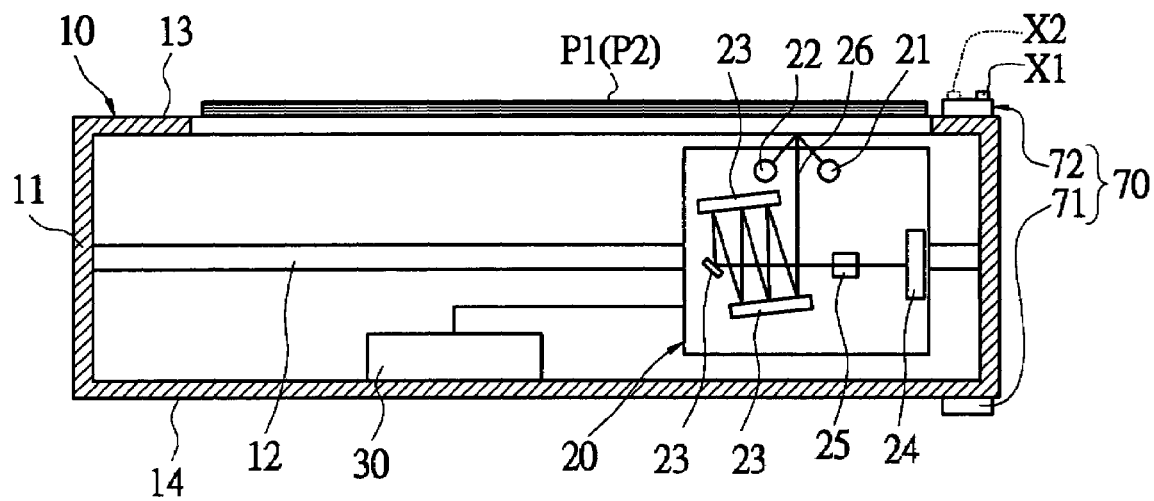
FIG. 5 is a schematic illustration showing a multi-function scanner according to a fourth embodiment of the invention.

FIG. 5 is a schematic illustration showing a multi-function scanner according to a fourth embodiment of the invention. Referring to FIG. 5, a scan mode selecting unit 70 includes a scan button 71 and a switch 72. The scan button 71 is mounted to the bottom 14 of the multi-function scanner 10, and the user may press the top 13 of the multi-function scanner 10 so as to enable the scan button 71 to control the scan module 20 to perform the first mode scan or the second mode scan. The first mode or the second mode is not changed until the user switches the switch 72.

In detail, the user may switch the switch 72 to a position X1 corresponding to the first mode, place the first document P1 on the scanner 10, and then press the first document P1 to simultaneously flatten the first document P1 and trigger the scan button 71 so as to perform the first mode scan. On the other hand, the user may also switch the switch 72 to a position X2 corresponding to the second mode, place the second document P2 on the scanner 10, and then press the second document P2 to simultaneously flatten the second document P2 and trigger the scan button 71 so as to perform the second mode scan. The design of this embodiment really facilitates the user's operation procedures.

Figure 6:
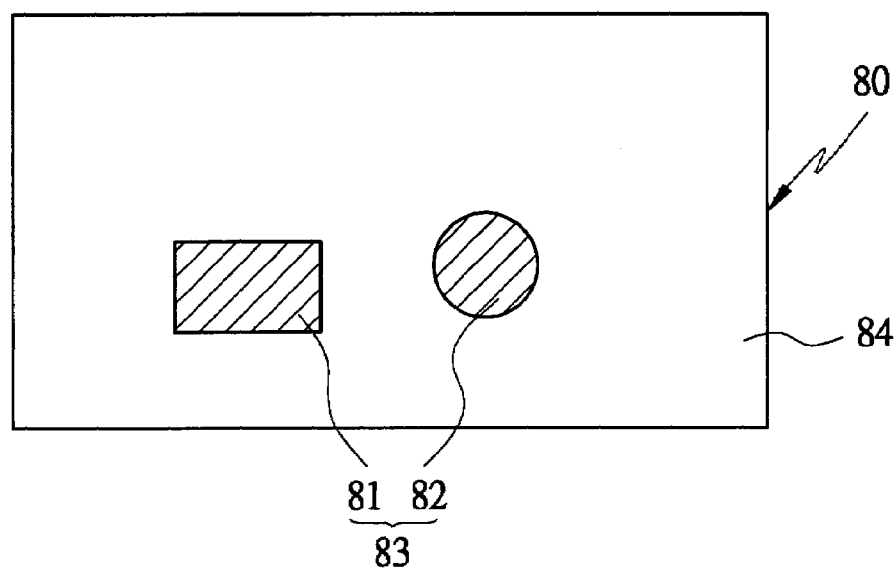
FIG. 6 is a schematic illustration showing a scanning method of the invention.

FIG. 6 is a schematic illustration showing a scanning method of the invention. As shown in FIG. 6, the method for the multi-function scanner may be utilized to scan a document 80 having a laser/anti-counterfeit mark. According to the method of the multi-function scanner, the scanner may scan a first image of the laser/anti-counterfeit mark and a second image of other parts, and the first and second images are then combined into a complete image by way of image processing. The method includes the steps of: pre-scanning the document 80 to get a preview image; recording zones 81 and 82 of the laser/anti-counterfeit marks that are selected by the user on the preview image, as a marked zone 83; using a visible light source to scan the document 80 and then obtain the first image of the zone 84 except for the marked zone 83; using an infrared light source to scan the document 80 and then obtain the second image of the marked zone 83; and combining the first image with the second image.

It is to be noted that the first image may be a color image or a black/white image. The marked zone 83 may include one or a plurality of sub-zones 81 and 82, and the second image may include a plurality of sub-images corresponding to the sub-zones 81 and 82. The sub-zones may be circular, rectangular, or have other geometric shapes.

The method of the invention has the following advantages. If only the infrared light source is used to scan the document 80, the color image cannot be obtained. If only the visible light source is used to scan the document 80, a clear second image cannot be obtained, and some images in the document 80 may not be presented in the second image. Using the method of the invention may preferably reproduce the image of the document 80 and satisfy the demands of the user on the first image and the second image.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A method for a multi-function scanner for scanning a document with a laser/anti-counterfeit mark, the method comprising the steps of:
    pre-scanning the document to obtain a preview image;
    recording a zone of the laser/anti-counterfeit mark selected by a user on the preview image as a marked zone;
    using a visible light source to scan the document so as to obtain a first image corresponding to the document excluding the marked zone;
    using an infrared light source to scan the document so as to obtain a second image corresponding to the marked zone; and
    combining the first image with the second image.

2. The method according to claim 1, wherein the first image is a color image.

3. The method according to claim 1, wherein the marked zone includes plural sub-zones that are not adjacent to each other or one another, and the second image includes plural sub-images corresponding to the sub-zones.

* * * * *